Jan. 28, 1958         G. M. VARNER         2,821,370

AUTOMATIC HOG FEEDER

Filed July 24, 1956         3 Sheets-Sheet 1

Garry M. Varner
INVENTOR.

Jan. 28, 1958     G. M. VARNER     2,821,370
AUTOMATIC HOG FEEDER

Filed July 24, 1956     3 Sheets-Sheet 2

Garry M. Varner
INVENTOR.

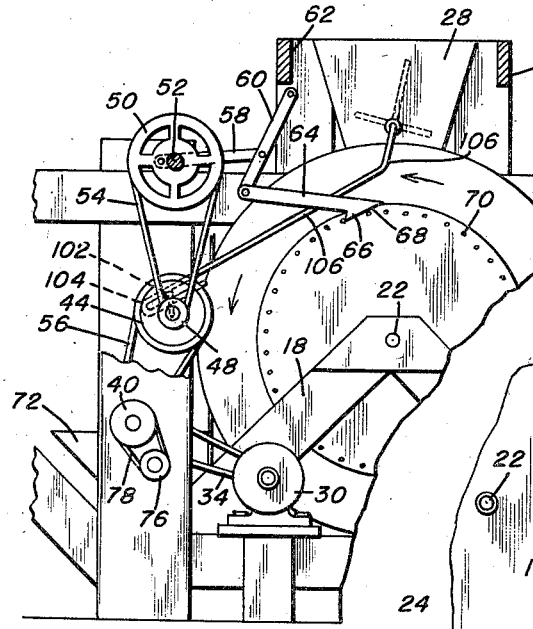

2,821,370
AUTOMATIC HOG FEEDER
Garry M. Varner, Soddy, Tenn.

Application July 24, 1956, Serial No. 599,855

10 Claims. (Cl. 259—10)

This invention generally relates to an automatic feeding device and more particularly relates to a device for automatically mixing dry feed with liquid and dispensing the same.

In feeding certain types of livestock such as hogs or the like, it is necessary that such animals be fed at predetermined time intervals for the most effective nutrition. In particular, the feeding of hogs usually requires the mixing of a dry food with a liquid which is more appetizing to the hogs and more readily digestible. Since it is necessary to feed the animals at regular intervals, it sometimes occurs that the persons raising the livestock are seriously inconvenienced by the necessity of preparing the feed or are unable to prepare the feed at the proper time. Accordingly, it is the primary object of the present invention to provide an automatic hog feeder which will automatically dispense the dry feed into a mixing receptacle along with a proper amount of liquid such as water and thoroughly mix the ingredients and dump the same into a suitable trough or the like such as a hog trough without the necessity of human control.

The present invention incorporates a dry feed dispensing apparatus in the form of a rotatable drum together with a pivotal receptacle receiving the dry feed and means for discharging water or liquid into the dry feed and also means for mixing the ingredients and dumping the receptacle at predetermined time intervals during the day with all of the operations being automatic and properly timed.

Other objects of the present invention will reside in its simplicity of construction, efficiency of operation, time saving features and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a partial side elevation similar to Figure 1 illustrating further structural details of the driving mechanism;

Figure 6 is an enlarged side elevation with portions broken away illustrating the dumping mechanism in operation; and, Figure 7 is a detailed sectional view of the control valve for the discharge conduit as well as the operating means therefor.

Figure 1:
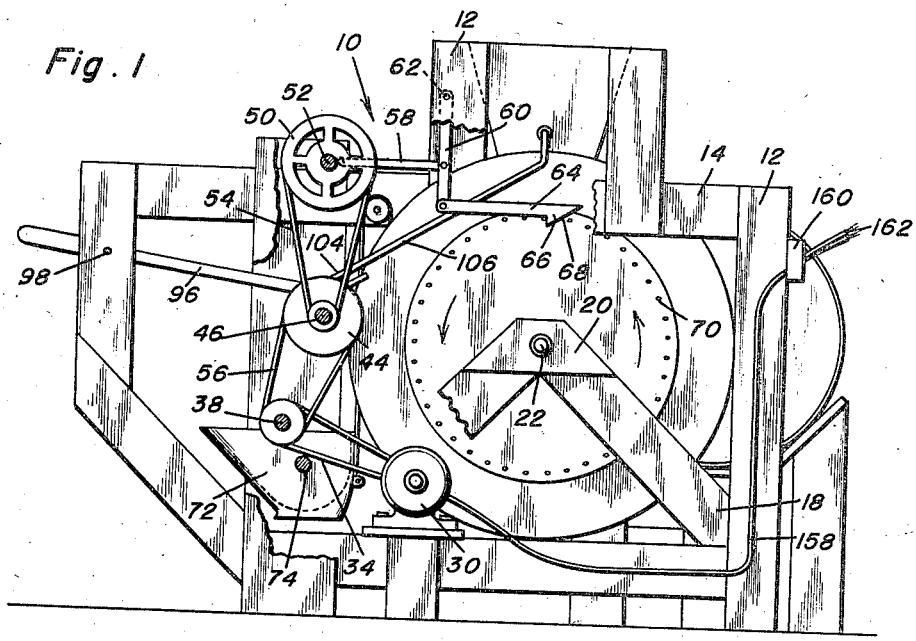
Figure 1 is a side elevational view of the automatic hog feeder of the present invention with portions of the supporting frame being broken away illustrating the details of construction of the driving mechanism.
Figure 2:
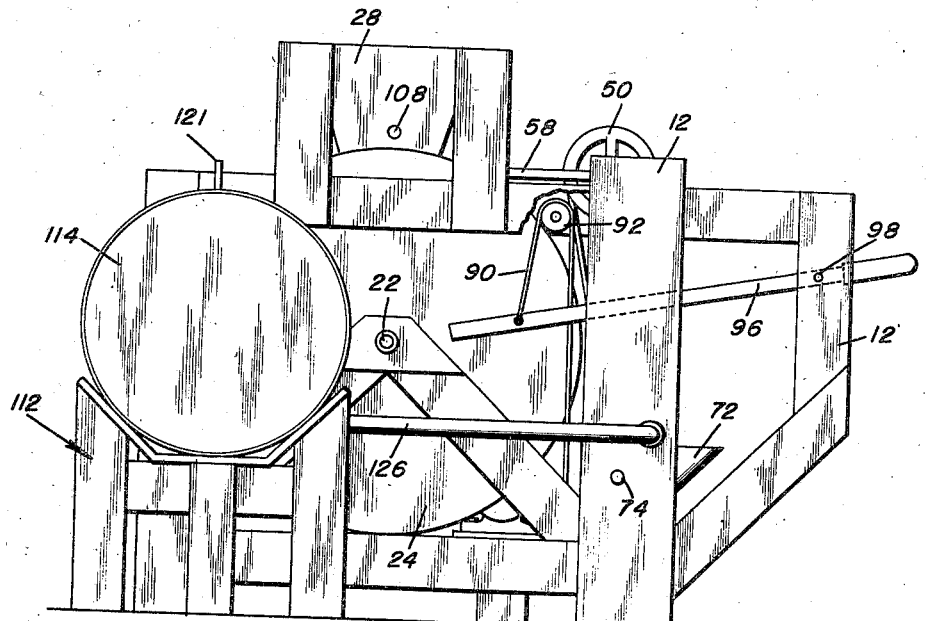
Figure 2 is a side elevational view of the hog feeder taken from the opposite side from Figure 1 with certain portions thereof being broken away for clarity.

Referring now specifically to the drawings, the numeral 10 generally designates the automatic hog feeder of the present invention which incorporates a supporting frame having a plurality of vertical uprights designated by the numeral 12 which are interconnected by longitudinal members 14 and transverse members 16 all of which cooperate to form a substantially rigid supporting frame which may be mounted on any suitable surface or which may be made portable if desired.

A pair of upwardly inclined support braces 18 are interconnected and form bearing members 20 for a transverse shaft 22 on which is mounted an enlarged cylindrical hollow drum 24 which is provided with an inwardly extending recess 26 in the periphery thereof for registry with the discharge end of a dry feed dispensing spout 28 which is mounted above the drum 24.

An electric motor 30 is mounted adjacent the bottom of the supporting frame and is provided with a power pulley 32 having a V-belt 34 encircling the same. The V-belt 34 also encircles an aligned pulley 36 on an idler shaft 38 which has a pulley 40 on the outer end thereof and also a pulley 42 on the inner end thereof. The pulley 42 is in alignment with an enlarged pulley 44 mounted on an upper idler shaft 46 having a smaller pulley 48 mounted thereon in alignment with an enlarged pulley 50 mounted on shaft 52. A V-belt 54 encircles the pulleys 48 and 50 and a V-belt 56 encircles the pulleys 42 and 44 for transferring rotational movement to the shaft 52. Mounted eccentrically on the pulley 50 is a connecting rod 58 having the free end thereof connected to a link 60 pivotally mounted on an upright 12 by pivot pin 62 wherein rotation of the pulley 50 will cause oscillation of the link 60 about pivot pin 62. The link 60 swings in substantially a vertical plane and at the lower end thereof is pivotally mounted a generally horizontally disposed actuating arm 64 having a downwardly facing hook portion 66 having an upwardly and outwardly inclined cam surface 68 for engagement with a plurality of laterally extending pins or pegs 70 mounted on the drum 24. When the motor 30 is actuated, the power is transferred in an obvious manner to the pulley 50 which causes movement of the connecting rod 58 for pivoting the link 60 in an oscillatory manner for generally reciprocating the arm 64 wherein the cam surface 68 will ride over a pin 70 and when the arm 64 is drawn back towards the shaft 52, the drum 24 will be rotated due to the tangential force exerted by the arm 64.

Figure 4:
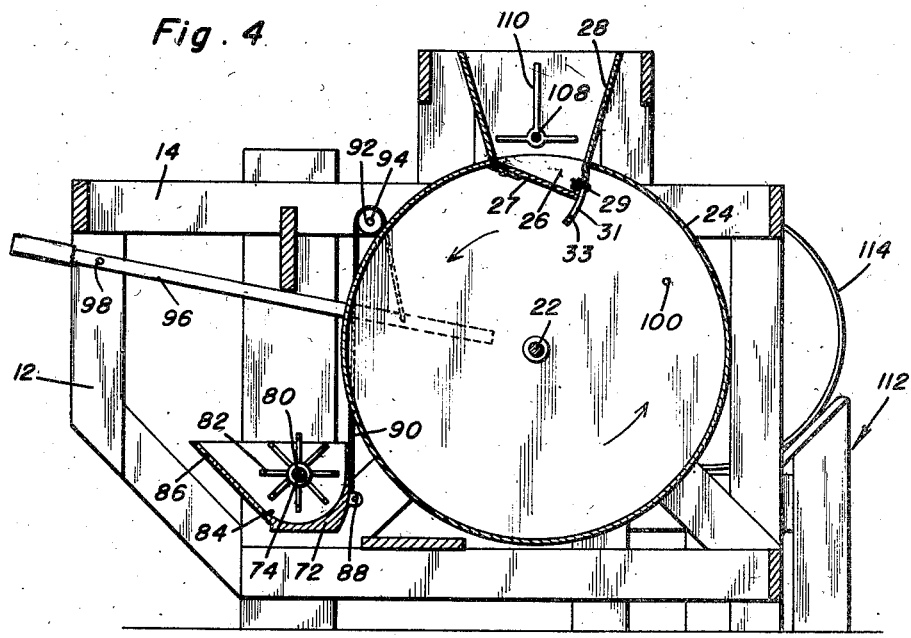
Figure 4 is a longitudinal, vertical sectional view taken substantially upon a plane passing along section line 4—4 of Figure 3 illustrating the relationship of the discharge spout and rotatable drum as well as the mixing receptacle.
Figure 3:
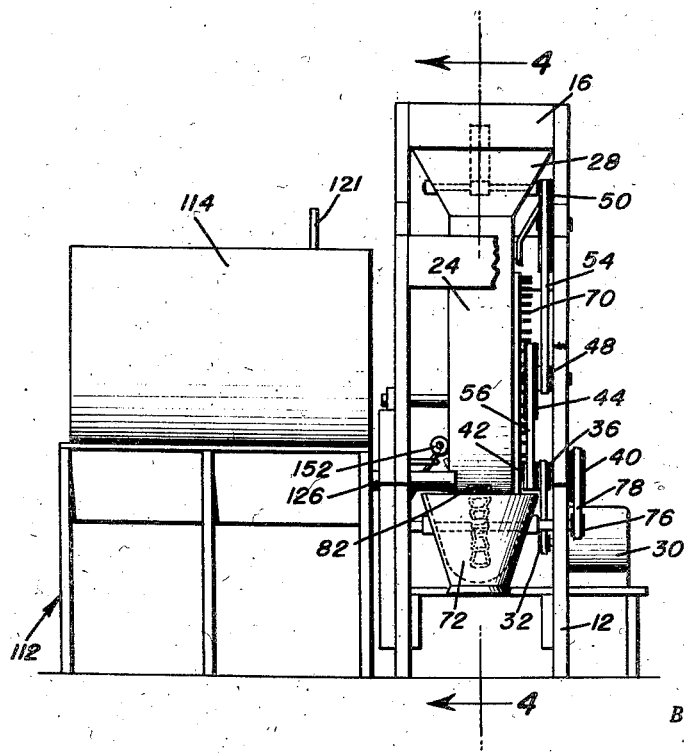
Figure 3 is an end view of the device taken from the mixing receptacle and with portions broken away illustrating the details of the driving mechanism.

Disposed between two uprights 12 adjacent the bottom of the support frame and forwardly of the drum 24 is a mixing receptacle 72 mounted on a transverse shaft 74. The shaft 74 extends outwardly beyond the vertical frame member 12 and terminates in a pulley 76 in alignment with the pulley 40 and a V-belt 78 encircles the aligned pulleys 40 and 76 for rotating the shaft 74 which has a mixer 80 mounted thereon. The mixer 80 is provided with a plurality of radial arms 82 each of which is formed substantially as a transverse loop for thoroughly agitating the material deposited in the receptacle 72. As illustrated in Figure 4, the bottom of the receptacle 72 is substantially rounded as designated by the numeral 84 whereby the outer edges of the radial arms 82 will be disposed closely adjacent to the bottom surfaces 84 of the receptacle 72 thereby thoroughly agitating the material in the receptacle 72. Also, the receptacle 72 is provided with an inclined discharge spout 86 which will discharge the material in a desired manner when the receptacle 72 is dumped by pivoting the same about the transverse shaft 74.

For dumping the receptacle 72, it will be seen that a projecting lug 88 is disposed on the rear of the receptacle 72 adjacent the bottom thereof for attachment of one end of a flexible line 90 which extends vertically upwardly and over a support pulley 92 mounted on a longitudinal member 14 by employing a pivot shaft 94. The free end of the flexible line 90 is then secured to an elongated pivot arm 96 which has a pivot pin 98 supporting the same adjacent the outer end thereof and on a vertical support member 12. The end of the arm 96 having the flexible line 90 attached thereto is disposed alongside the drum 24 whereby a projecting lug or pin 100 on the drum 24 will cause the end of the arm 96 to swing downwardly substantially as illustrated in Figure 6 which will move the rear end of the receptacle 72 upwardly for dumping the same substantially as illustrated in Figure 6.

The enlarged pulley 44 on the shaft 46 is provided with a laterally extending eccentric pin 102 which is received in the U-shaped end 104 of an elongated actuating lever 106 which is secured to a transverse shaft 108 of a T-shaped agitator 110 which has the shaft 108 disposed at the juncture between the transverse and perpendicular portion of the T-shaped agitator 110 which is disposed in the discharge spout 28 for assuring proper filling of the recess 26 in the drum 24 when the recess is aligned with the spout 28. Thus, it will be seen that the motor 30 operates the mixer, rotates the drum 24, agitates the material in the hopper or spout 28 for assuring proper filling of the recess 26 and dumps the receptacle 72. The relative sizes of the pulleys assure proper rotational speeds of the various driven mechanisms.

Disposed to one side of the supporting frame is an auxiliary supporting frame generally designateed by the numeral 112 having a tank or barrel 114 resting thereon in substantially a horizontal position. Referring now specifically to Figure 7, the numeral 116 indicates the end of the tank 144 nearest the drum 24. Disposed on the inner surface of the end wall 116 is a cylindrical guard 118 having an inlet of aperture 120 in the end wall thereof forming an inlet and outlet tube 122 disposed in an aperture 124 in the end wall 116. The discharge tube 122 is connected to a discharge conduit 126 at the outer end thereof with this conduit extending alongside the supporting frame and extending through a vertical support member 12 and extending into overlying relation to the receptacle 72 for discharging water into the receptacle 72 in a manner controlled by a discharge valve 128. The discharge valve 128 is provided with an elongated stem 130 mounted in depending lugs 132 in the discharge tube 122. Longitudinal movement of the stem 130 will move the valve 128 onto or away from the inner end of the discharge tube 122. The valve 128 may be constructed of a resilient material or any similar material which will be long-lasting and will engage the end of the tube 122 in sealing relation.

The stem 130 is provided with an outwardly extending lug 134 to which an actuating rod 136 is connected by a U-shaped lower end 138 with the upper end thereof being supported from pivot lugs 140. The tensioned coil spring 142 extends between the arm 136 and a vertical support member 12 for urging the valve 128 to closed position. An elongated actuating lever 144 is connected to the arm 136 adjacent the center thereof and extends through an aperture 146 in the vertical support 12 and terminates in a pivotal connection with an operating arm 148 having one end thereof secured to pivot lugs 150 and the other end thereof provided with a roller 152 which acts as a cam follower for engagement with a face cam 154 on the wall of the drum 24 whereby rotation of the drum 24 will move the cam 154 under the roller 152 thereby moving the arm 144 inwardly and also moving the arm 136 inwardly for moving the stem 130 and valve 128 inwardly for opening the valve and permitting discharge of liquid or water through the conduit 126. As illustrated, the discharge tube 122 has a relatively small slot for accommodating the pivotal movement of the arm 136 with the slot being designated by the numeral 156. Inasmuch as the valve 128 is only off of the valve seat for a relatively short time, negligible leakage of liquid will be lost through the slot 156. Since this liquid is usually water, the amount of water lost through such slot would not impair the efficiency of the device. If desired, a suitable seal could be provided for this slot.

The electric motor 30 is connected to a suitable electrical conductor 158 that is connected through a set of holding points 160 having electrical conductors 162 connected to a timer clock wherein the timer clock may be arranged and so constructed to provide a feeding operation at various predetermined intervals such as every six hours or every twelve hours. As soon as the timer clock energizes the set of points 160, the set of points 160 hold the electrical circuit in energized position until such time as a complete cycle of the automatic hog feeder 10 has been completed and this cycle includes a single complete revolution of the drum 24 which revolution includes the receiving of dry feed from the hopper 28 into the recess 26 after which the dry feed along with water from the tank 114 is discharged into the mixing bucket 72 wherein the mixer thoroughly agitates the water and dry feed thereby assuring a homogeneous mass after which the mixing receptacle 72 is dumped. The recess 26 is provided with a pivotally adjustable bottom 27 maintained in adjusted position by a fastener 29 extending through a slot 31 in an arcuate end plate 33 for permitting adjustment of the size of the recess thereby adjusting the quantity of dry feed discharged into the receptacle during each cycle of operation. The bracket having the pivot lugs 150 thereon is longitudinally adjustably mounted on a support 149 mounted on frame 12. The support 149 is provided with a slot 151 for adjustably receiving a clamp bolt 153 on the bracket. This permits increase or decrease in the quantity of water discharged into the receptacle thereby maintaining the water and dry feed ratio in a desired relation. Also the cylindrical guard 118 is in the form of a solid walled enclosure with a single inlet opening 120 in the end wall and a vertical air tube 121 extending through the top of the barrel 114. This enclosure 118 acts as a pressure resistor or control device for controlling the inflow of water into enclosure 118 for generally providing a constant water pressure during the outlet cycle of the water regardless of the level of water in barrel 114. This assures that substantially the same amount of water will be discharged for each cycle of operation. The entire operation of the device is completely automatic and by providing a proper timer clock, the operation of the device may be controlled so that it is only necessary that a person feeding the animals replenish the supply of water or liquid in the tank 114 and replenish the supply of dry feed in the hopper 28 as the need may occur which would not require the presence of persons for each feeding operation since the receptacle 72 may dump the mixed feed directly into a hog trough or other trough accessible to live stock.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A device for automatically mixing liquid and dry feed and dispensing the same comprising a support frame, means for supplying dry feed, means for supplying liquid, a receptacle pivotally mounted on said frame, a powered mixer rotatable in said receptacle, a rotatable dispensing drum for receiving dry feed from the feed supply means and dumping a quantity of dry feed into the receptacle, means operated by said drum for discharging the liquid into said receptacle, and means operated by said drum for dumping said receptacle and the mixed feed therein.

2. A device for automatically mixing liquid and dry feed and dispensing the same comprising a support frame, means for supplying dry feed, means for supplying liquid, a receptacle pivotally mounted on said frame, a powered mixer rotatable in said receptacle, a rotatable dispensing drum for dumping a quantity of dry feed into the receptacle, means operated by said drum for discharging the liquid into said receptacle, and means operated by said drum for dumping said receptacle and the mixed feed therein, said drum being cylindrical and provided with a recess in the periphery thereof, said means for supplying dry feed including a hopper having a discharge spout in engagement with the upper portion of the drum for filling said recess during each revolution of the drum.

3. A device for automatically mixing liquid and dry feed and dispensing the same comprising a support frame, means for supplying dry feed, means for supplying liquid, a receptacle pivotally mounted on said frame, a powered mixer rotatable in said receptacle, a rotatable dispensing drum for receiving dry feed from the feed supply means and dumping a quantity of dry feed into the receptacle, means operated by said drum for discharging the liquid into said receptacle, and means operated by said drum for dumping said receptacle and the mixed feed therein, said liquid supply means including a tank, a discharge conduit communicating with the tank and the receptacle, a valve for controlling the flow of liquid through the conduit, and a cam on said drum for actuating said valve and constituting the means operated by said drum for discharging the liquid into the receptacle.

4. A device for automatically mixing liquid and dry feed and dispensing the same comprising a support frame, means for supplying dry feed, means for supplying liquid, a receptacle pivotally mounted on said frame, a powered mixer rotatable in said receptacle, a rotatable dispensing drum for receiving dry feed from the feed supply means and dumping a quantity of dry feed into the receptacle, means operated by said drum for discharging the liquid into said receptacle, and means operated by said drum for dumping said receptacle and the mixed feed therein, said receptacle being mounted on a central shaft, said mixer being rotatably mounted on said shaft and including a plurality of radial arms, each of said arms being in the form of a transverse loop, said receptacle having a rounded inner surface whereby the arms are disposed adjacent the inner surface for thoroughly mixing the liquid and dry feed into a homogeneous mass.

5. A device for automatically mixing liquid and dry feed and dispensing the same comprising a support frame, means for supplying dry feed, means for supplying liquid, a receptacle pivotally mounted on said frame, a powered mixer rotatable in said receptacle, a rotatable dispensing drum for receiving dry feed from the feed supply means and dumping a quantity of dry feed into the receptacle, means operated by said drum for discharging the liquid into said receptacle, and means for dumping said receptacle and the mixed feed therein, said means for dumping said receptacle including a pivotal lever mounted on said frame, a line interconnecting the lever and the receptacle for dumping said receptacle upon pivotal movement of the lever, said lever extending alongside said drum, and a projecting lug on said drum for engaging the lever and pivoting the same for dumping said receptacle.

6. A device for automatically mixing liquid and dry feed and dispensing the same comprising a support frame, means for supplying dry feed, means for supplying liquid, a receptacle pivotally mounted on said frame, a powered mixer rotatable in said receptacle, a rotatable dispensing drum for dumping a quantity of dry feed into the receptacle, means operated by said drum for discharging the liquid into said receptacle, and means operated by said drum for dumping said receptacle and the mixed feed therein, said drum being cylindrical and provided with a recess in the periphery thereof, said means for supplying dry feed including a hopper having a discharge spout in engagement with the upper portion of the drum for filling said recess during each revolution of the drum, said liquid supply means including a tank, a discharge conduit communicating with the tank and the receptacle, a valve for controlling the flow of liquid through the conduit, and a cam on said drum for actuating said valve and constituting the means operated by said drum for discharging liquid into the receptacle.

7. A device for automatically mixing liquid and dry feed and dispensing the same comprising a support frame, means for supplying dry feed, means for supplying liquid, a receptacle pivotally mounted on said frame, a powered mixer rotatable in said receptacle, a rotatable dispensing drum for dumping a quantity of dry feed into the receptacle, means operated by said drum for discharging the liquid into said receptacle, and means operated by said drum for dumping said receptacle and the mixed feed therein, said drum being cylindrical and provided with a recess in the periphery thereof, said means for supplying dry feed including a hopper having a discharge spout in engagement with the upper portion of the drum for filling said recess during each revolution of the drum, said liquid supply means including a tank, a discharge conduit communicating with the tank and the receptacle, a valve for controlling the flow of liquid through the conduit, and a cam on said drum for actuating said valve and constituting the means operated by said drum for discharging liquid into the receptacle, said receptacle being mounted on a central shaft, said mixer being rotatably mounted on said shaft and including a plurality of radial arms, each of said arms being in the form of a transverse loop, said receptacle having a rounded inner surface whereby the arms are disposed adjacent the inner surface for thoroughly mixing the liquid and dry feed into a homogeneous mass.

8. A device for automatically mixing liquid and dry feed and dispensing the same comprising a support frame, means for supplying dry feed, means for supplying liquid, a receptacle pivotally mounted on said frame, a powered mixer rotatable in said receptacle, a rotatable dispensing drum for dumping a quantity of dry feed into the receptacle, means operated by said drum for discharging the liquid into said receptacle, and means for dumping said receptacle and the mixed feed therein, said drum being cylindrical and provided with a recess in the periphery thereof, said means for supplying dry feed including a hopper having a discharge spout in engagement with the upper portion of the drum for filling said recess during each revolution of the drum, said liquid supply means including a tank, a discharge conduit communicating with the tank and the receptacle, a valve for controlling the flow of liquid through the conduit, and a cam on said drum for actuating said valve and constituting the means operated by said drum for discharging liquid into the receptacle, said receptacle being mounted on a central shaft, said mixer being rotatably mounted on said shaft and including a plurality of radial arms, each of said arms being in the form of a transverse loop, said receptacle having a rounded inner surface whereby the arms are disposed adjacent the inner surface for thoroughly mixing the liquid and dry feed into a homogeneous mass, said means for dumping said receptacle including a pivotal lever mounted on said frame, a line interconnecting the lever and the receptacle for dumping said receptacle upon pivotal movement of the lever, said lever extending alongside said drum, and a projecting lug on said drum for engaging the lever and pivoting the same for dumping said receptacle.

9. The combination of claim 8 wherein said hopper includes a powered agitator for assuring filling of the recess in the drum.

10. A machine for automatically mixing liquid and dry feed and dumping the mixture into a feed trough, said machine comprising a frame, a drum rotatably mounted on said frame, said drum having means for receiving a charge of dry feed at one point during the rotation thereof and discharging the charge at another point during the same revolution, a tiltable mixing receptacle for receiving the charge of dry feed from the drum, means operated by rotation of the drum for discharging a quantity of liquid into the receptacle, a powered agitator rotatably mounted in said receptacle, and means operated by said drum for tilting said receptacle and dumping the mixture therefrom.

References Cited in the file of this patent

UNITED STATES PATENTS

| | | |
|---|---|---|
| 225,213 | Dieryckx | May 9, 1880 |
| 1,226,108 | Olney | May 15, 1917 |
| 1,510,165 | Temple | Sept. 30, 1924 |
| 2,256,422 | Brayer | Sept. 16, 1941 |